United States Patent
Hasuo (10) Patent No.: US 10,220,523 B2
(45) Date of Patent: Mar. 5, 2019

(54) CONVEYING ROBOT

(71) Applicant: FANUC CORPORATION, Yamanashi (JP)

(72) Inventor: Takeshi Hasuo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/643,821

(22) Filed: Jul. 7, 2017

(65) Prior Publication Data

US 2018/0021961 A1 Jan. 25, 2018

(30) Foreign Application Priority Data

Jul. 21, 2016 (JP) ................... 2016-143423

(51) Int. Cl.
*B25J 18/04* (2006.01)
*B25J 15/04* (2006.01)
*B25J 18/00* (2006.01)

(52) U.S. Cl.
CPC ............... *B25J 18/04* (2013.01); *B25J 15/04* (2013.01); *B25J 18/007* (2013.01)

(58) Field of Classification Search
CPC ......... B25J 9/06; B25J 15/0014; B25J 18/025
USPC ..................... 414/680, 732, 744.5
See application file for complete search history.

(56) References Cited

U.S. PATENT DOCUMENTS

| | | | | |
|---|---|---|---|---|
| 4,695,027 A | * | 9/1987 | Lindholm | B25J 9/0084 248/123.2 |
| 5,884,515 A | * | 3/1999 | Milman | E05B 47/068 192/84.21 |
| 6,213,906 B1 | | 4/2001 | Codatto | |
| 8,918,204 B2 | * | 12/2014 | Cho | B21D 43/05 414/225.01 |
| 2011/0254299 A1 | | 10/2011 | Takeda | |
| 2017/0225325 A1 | | 8/2017 | Yoon | |

FOREIGN PATENT DOCUMENTS

| | | |
|---|---|---|
| EP | 3 213 882 A1 A1 | 9/2017 |
| JP | H03-166082 | 7/1991 |
| JP | H05-69362 A | 3/1993 |

(Continued)

OTHER PUBLICATIONS

Japanese Office Action dated Jul. 17, 2018, in connection with corresponding JP Application No. 2016-143423 (9 pgs., including English translation).

(Continued)

*Primary Examiner* — Ronald P Jarrett
(74) *Attorney, Agent, or Firm* — Maier & Maier, PLLC (57) ABSTRACT

The installation space is made compact, the conveying speed of a workpiece is increased, and interference with peripheral devices is readily avoided. Provided is a conveying robot including: a pedestal; a rotating base provided in a rotatable manner about a first axis, which is substantially horizontal, relative to the pedestal; a first arm provided on the rotating base in a swivelable manner about a second axis that is orthogonal to an axis parallel to the first axis; and a second arm that is provided on the first arm in a movable manner in a longitudinal direction of the first arm and whose distal end supports a wrist unit, which is capable of holding a workpiece to be conveyed.

9 Claims, 12 Drawing Sheets

(56) References Cited

FOREIGN PATENT DOCUMENTS

| | | |
|---|---|---|
| JP | H07-308876 A | 11/1995 |
| JP | H09-70778 A | 3/1997 |
| JP | 2934104 B2 | 8/1999 |
| JP | 2002-510251 A | 4/2002 |
| JP | 3350496 B2 | 11/2002 |
| JP | 2003-019682 A | 1/2003 |
| JP | 2004-337918 A | 12/2004 |
| JP | 2007-130729 A | 5/2007 |
| JP | 2008-114249 A | 5/2008 |
| JP | 2010-94695 A | 4/2010 |
| JP | 2011-056646 A | 3/2011 |
| JP | 5603124 B2 | 10/2014 |
| JP | 5631805 B2 | 11/2014 |
| JP | 2016-087717 | 5/2016 |

OTHER PUBLICATIONS

Japanese Search Report dated Jul. 10, 2018, in connection with corresponding JP Application No. 2016-143423 (34 pgs., including English translation).

Office Action dated Jan. 8, 2019 in corresponding Japanese Patent Application No. 2016-143423; 9 pages including English-language translation.

* cited by examiner

CONVEYING ROBOT

CROSS-REFERENCE TO RELATED APPLICATIONS

This application is based on Japanese Patent Application No. 2016-143423, the contents of which are incorporated herein by reference.

TECHNICAL FIELD

The present invention relates to conveying robots.

BACKGROUND ART

An articulated conveying device that includes arms disposed in a suspended manner and also in a movable manner along beams extended between columns of the pressing devices is known as means for conveying a workpiece between pressing devices in the related art (for example, see Patent Literature 1).

A conveying device that supports a crossbar disposed between two arm supports, which are installed between pressing devices and stand upright at opposite sides of the pressing devices in the longitudinal direction, and extending along the entire length of the pressing devices is also known. This conveying device causes a workpiece-holding device supported by the crossbar to move between the pressing devices (for example, see Patent Literature 2).

Another conveying device in which a vertical articulated robot is disposed on a support base disposed between pressing devices and at one side of the pressing devices in the longitudinal direction, and handles a workpiece between the pressing devices is known (for example, see Patent Literature 3).

A robot that moves an arm like a pendulum is also known (for example, see Patent Literature 4).

CITATION LIST

Patent Literature

[PTL 1]
The Publication of Japanese Patent No. 5631805
[PTL 2]
The Publication of Japanese Patent No. 5603124
[PTL 3]
The Publication of Japanese Patent No. 3350496
[PTL 4]
The Publication of Japanese Patent No. 2934104

SUMMARY OF INVENTION

An object of the present invention is to provide a conveying robot that can make the installation space compact, can increase the conveying speed of a workpiece, and can readily avoid interference with peripheral devices.

Solution to Problem

An aspect of the present invention provides a conveying robot including: a pedestal; a rotating base provided in a rotatable manner about a first axis, which is substantially horizontal, relative to the pedestal; a first arm provided on the rotating base in a swivelable manner about a second axis that is orthogonal to an axis parallel to the first axis; and a second arm that is provided on the first arm in a movable manner along a longitudinal direction of the first arm and whose distal end supports a wrist unit, which is capable of holding a workpiece to be conveyed.

In the above aspect, a movement range within which the first arm is moved about the first axis by the rotating base may be disposed in or below a substantially horizontal plane including the first axis.

In the above aspect, the pedestal may be installed such that the wrist unit is moved substantially in the same direction as a conveying direction of the workpiece by a swiveling motion of the first arm about the first axis caused by the rotating base.

In the above aspect, the wrist unit may include at least two rotational shafts that intersect each other.

In the above aspect, the conveying robot may further include a sliding arm having a band-plate-like frame and a pair of sliders disposed at opposite sides from each other with the frame interposed therebetween in a thickness direction. The pair of sliders may be provided in a relatively movable manner along a longitudinal direction of the frame. One of the sliders may be attached to the rotational shaft at a terminal end of the wrist unit.

In the above aspect, the other slider may be provided with a distal-end swivel shaft that swivels a tool, which grips the workpiece, about an axis extending in a width direction of the frame.

In the above aspect, the conveying robot may further include an attaching/detaching mechanism that is disposed between the pedestal and the tool and that makes the rotating base, the first arm, the second arm, the wrist unit, the sliding arm, or the tool mechanically attachable and detachable together with an electrical wire by means of an electrical signal.

In the above aspect, the conveying robot may further include an attaching/detaching mechanism that can mechanically attach and detach the rotational shaft at the terminal end of the wrist unit to and from the sliding arm together with an electrical wire therebetween by means of an electrical signal.

In the above aspect, the wrist unit may include three rotational shafts that intersect each other, and the wrist unit and one of the sliders may be attached to each other such that the rotational shaft at the terminal end of the wrist unit is inclined in a width direction of the sliding arm.

DESCRIPTION OF EMBODIMENTS

A conveying robot 1 according to a first embodiment of the present invention will be described below with reference to the drawings.

Figure 1:
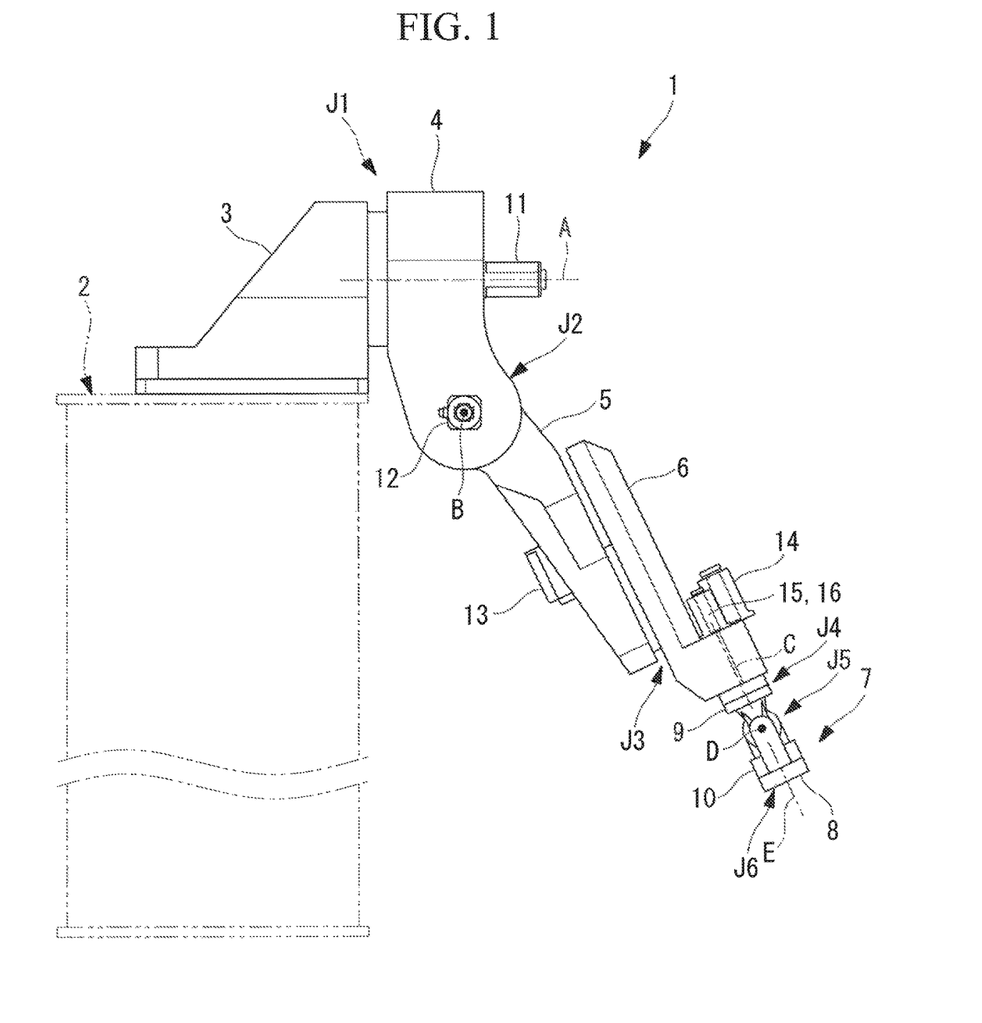
FIG. 1 is a side view illustrating a conveying robot according to a first embodiment of the present invention.
Figure 2:
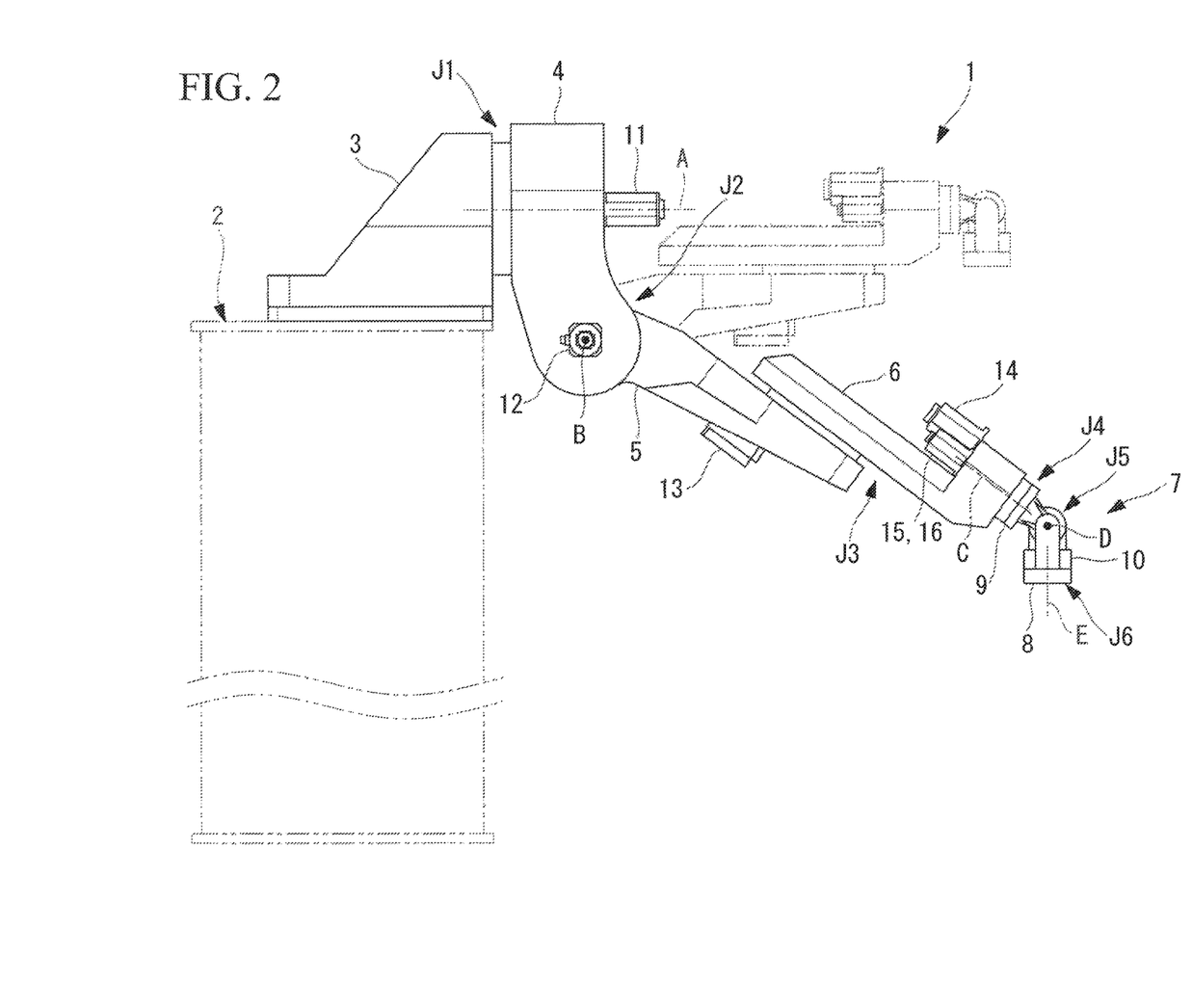
FIG. 2 is a side view illustrating a state where a first arm and a second arm of the conveying robot in FIG. 1 are moved.
Figure 3:
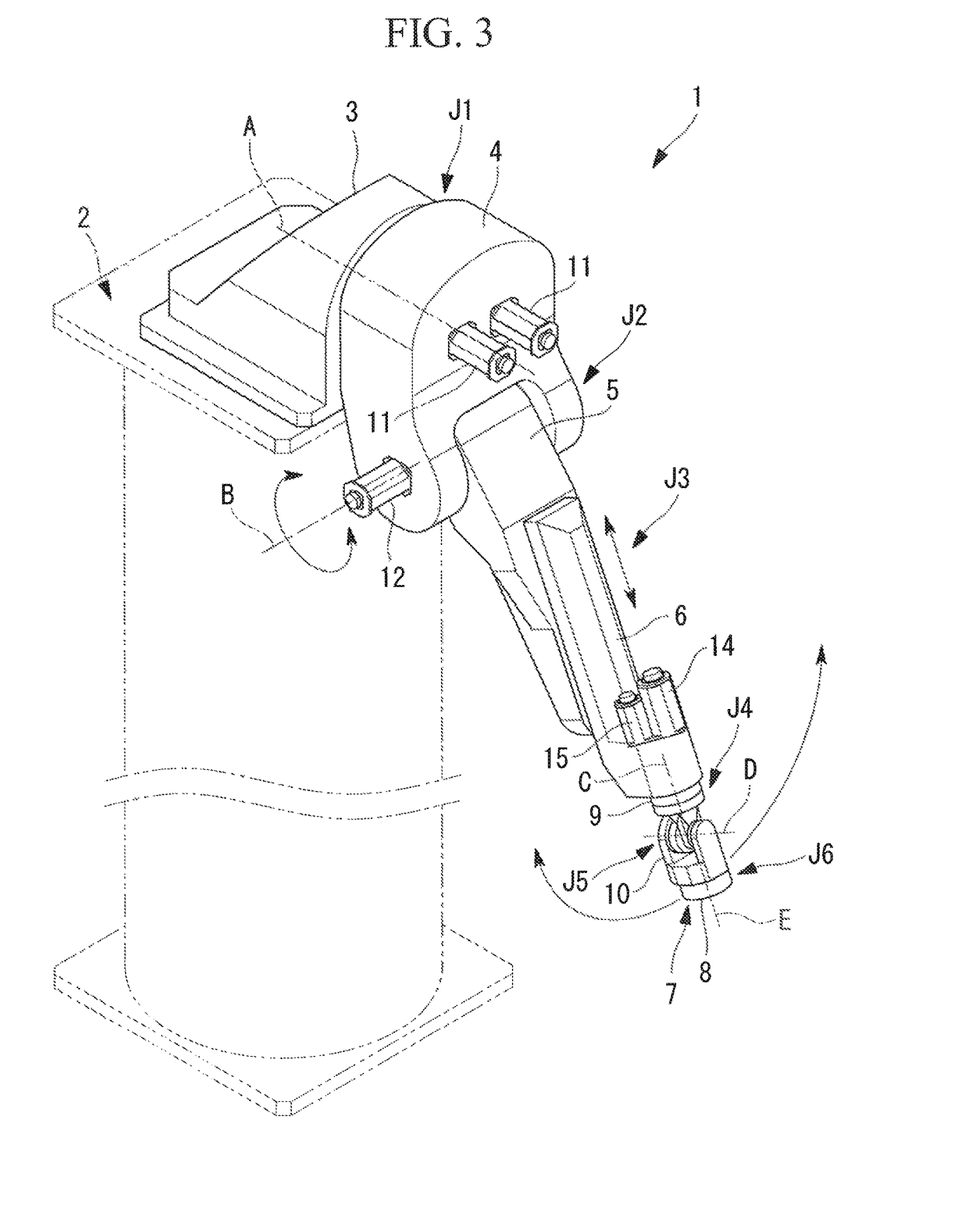
FIG. 3 is a perspective view illustrating the conveying robot in FIG. 1.

As shown in FIGS. 1 to 3, the conveying robot 1 according to this embodiment includes a pedestal 3 fixed to a support base 2, a rotating base 4 supported in a rotatable manner about a first axis A, which is horizontal, by one side surface of the pedestal 3, a first arm 5 supported in a swiveable manner about a second axis B extending orthogonally to an axis (not shown) parallel to the first axis A with a distance therebetween, a second arm 6 supported in a linearly movable manner in the longitudinal direction of the first arm 5, and a wrist unit 7 disposed at the distal end of the second arm 6.

The conveying robot 1 includes a first shaft J1 that rotates the rotating base 4 about the first axis A relative to the pedestal 3, a second shaft J2 that swivels the first arm 5 about the second axis B relative to the rotating base 4, a third shaft J3 that linearly moves the second arm 6 in the longitudinal direction of the first arm 5 relative to the first arm 5, and the wrist unit 7.

The wrist unit 7 may include two or more rotational shafts that rotate about axes C, D, and E that intersect one another.

In this embodiment, the wrist unit 7 includes three rotational shafts (i.e., a fourth shaft J4, a fifth shaft J5, and a sixth shaft J6) that rotate about axes C, D, and E intersecting one another, and a face plate 8 for fixing, for example, a tool thereto is disposed on the rotational shaft J6 located at the terminal end. The fourth shaft J4 rotates a first wrist housing 9 about a fourth axis (rotational axis) C, which extends parallel to the longitudinal direction of the first arm 5, relative to the second arm 6. The fifth shaft J5 rotates a second wrist housing 10 about a fifth axis (rotational axis) D extending orthogonally to the fourth axis C. The sixth shaft J6 rotates the face plate 8 about a sixth axis (rotational axis) E extending orthogonally to the fifth axis D. In the drawings, reference signs 11 to 16 denote respective motors for the first shaft J1 to the sixth shaft J6.

Because the first shaft J1 rotates the rotating base 4 about the first axis A, which is horizontal, the first shaft J1 causes the rotating base 4, as well as the first arm 5 attached to the rotating base 4 to the wrist unit 7, to swivel like a pendulum. This pendulum-like movement range is disposed in or below a substantially horizontal plane including the first axis A. In a case where a workpiece (not shown) is to be conveyed by utilizing the pendulum-like motion, since gravity constantly acts in the direction that aids acceleration and deceleration, a swiveling motion caused by operating the first shaft J1 can be performed at high speed with low energy.

The second shaft J2 is capable of changing the inclination of the first arm 5 relative to the rotating base 4. The third shaft J3 is capable of linearly moving the second arm 6 relative to the first arm 5 so as to increase and decrease the length of the entire arm constituted of the first arm 5 and the second arm 6.

By means of the first shaft J1 to the third shaft J3, the wrist unit 7 can be disposed at a freely-chosen position within the movement range. By means of the fourth shaft J4 to the sixth shaft J6, the orientation of the workpiece attached to the face plate 8 can be freely adjusted.

The operation of the conveying robot 1 according to this embodiment having the above-described configuration will be described below.

With the conveying robot 1 according to this embodiment, the rotating base 4, the first arm 5, and the second arm 6 can be rotated like a pendulum about the first axis A by operating the first shaft J1, so that the wrist unit 7 disposed at the distal end of the second arm 6 can be moved substantially in the horizontal direction below the first axis A. Therefore, by aligning the conveying direction with this substantially horizontal direction, the workpiece can be conveyed substantially in the horizontal direction.

In this case, when conveying the workpiece in accordance with the pendulum-like motion, gravity constantly acts in the direction that aids acceleration and deceleration, so that a swiveling motion caused by operating the first shaft J1 can be performed at high speed with low energy. This is advantageous in that the conveying speed can be increased.

In this embodiment, the rotating base 4 is rotated by 90° in either direction in a state where the first arm 5 is moved to a substantially horizontal position, as indicated by a dashed line in FIG. 2, so that the entire conveying robot 1 is disposed higher than the installation surface of the lower section of the pedestal 3, whereby a compact configuration suitable for the conveyance by the conveying robot 1 can be achieved.

By operating the second shaft J2 to change the inclination angle of the first arm 5 and also by operating the third shaft J3 to linearly move the second arm 6, the horizontal position and the vertical position of the wrist unit 7 relative to the pedestal 3 can be adjusted. Specifically, even if the support base 2, on which the pedestal 3 of the conveying robot 1 is installed, is installed significantly away, toward one side, from the conveying space for conveying the workpiece, the conveying space can be approached by means of the wrist unit 7.

Therefore, components for installation other than the support base 2 are not necessary, so that a wide space can be provided at the opposite side from the support base 2. This is advantageous in terms of improved ease of maintenance of the conveying robot 1 and peripheral devices.

The first arm 5 and the second arm 6 can constantly be disposed along a line having the shortest distance between the rotating base 4 and the wrist unit 7, thereby minimizing interference with peripheral devices when the first shaft J1 rotates the rotating base 4.

Although simply rotating the rotating base 4 about the first axis A or simply swiveling the first arm 5 about the second axis B causes the wrist unit 7 to move along an arc-shaped trajectory, the wrist unit 7 can be moved along a linear trajectory by combining the linear movement of the second arm 6 caused by the second shaft J2 with the rotation of the rotating base 4 and the swiveling of the first arm 5. This can significantly reduce interference with peripheral devices during a conveying operation.

In this embodiment, a so-called in-line wrist in which the three axes C, D, and E orthogonal to one another are disposed in a compact fashion is employed as the wrist unit 7, so that the workpiece can be disposed at an arbitrary position and orientation by means of six shafts J1, J2, J3, J4, J5, and J6 including the first shaft J1 to the third shaft J3. This is advantageous in terms of high versatility.

Next, a conveying robot 30 according to a second embodiment of the present invention will be described below with reference to the drawings.

In this embodiment, components identical to those of the conveying robot 1 according to the first embodiment described above will be given the same reference signs, and descriptions thereof will be omitted.

As shown in FIGS. 4 to 7, the conveying robot 30 according to this embodiment differs from the conveying robot 1 according to the first embodiment in that a sliding arm 17 is attached to the sixth shaft J6 serving as a rotational axis E at the terminal end of the wrist unit 7.

Figure 4:
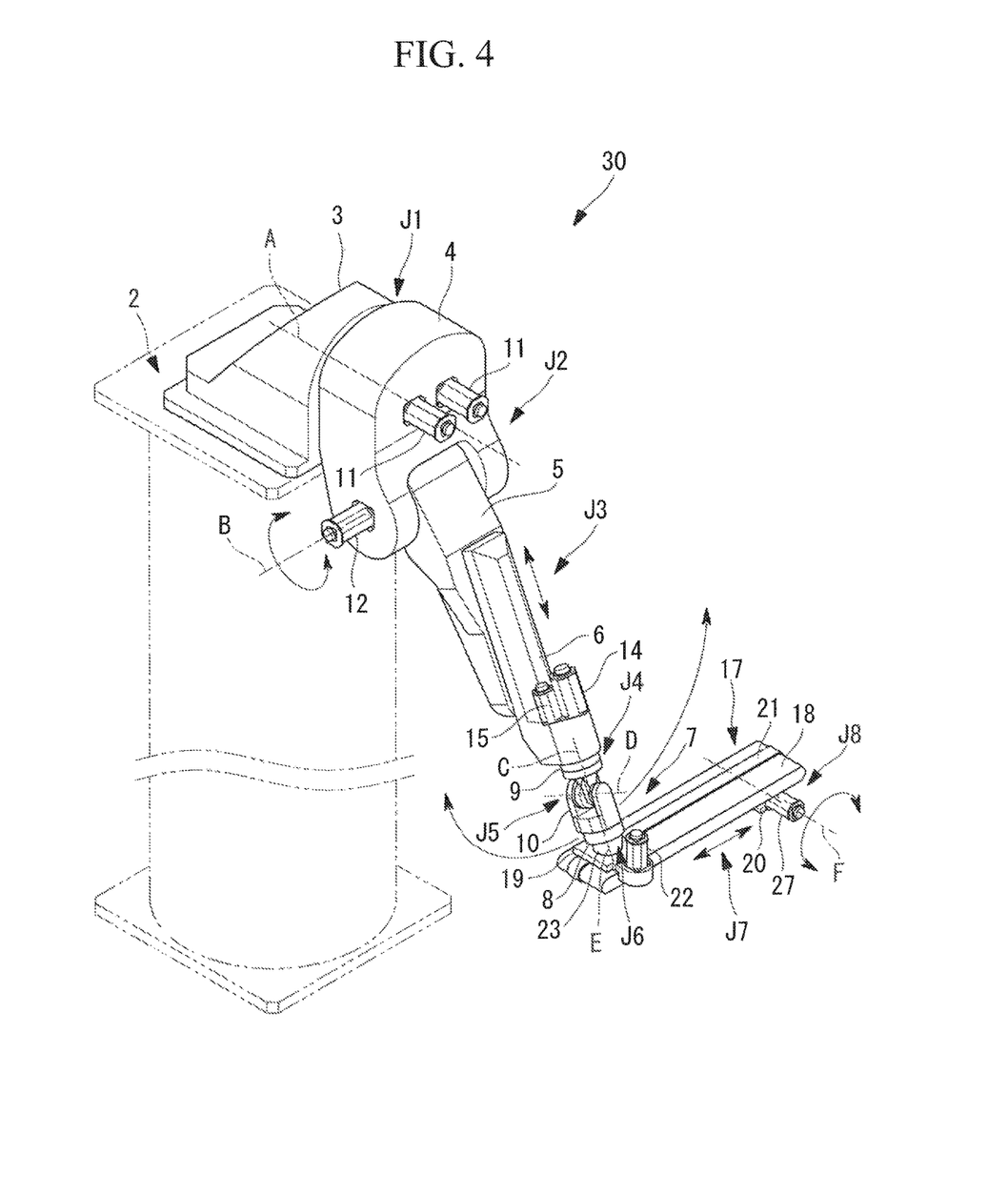
FIG. 4 is a perspective view illustrating a conveying robot according to a second embodiment of the present invention.
Figure 5:
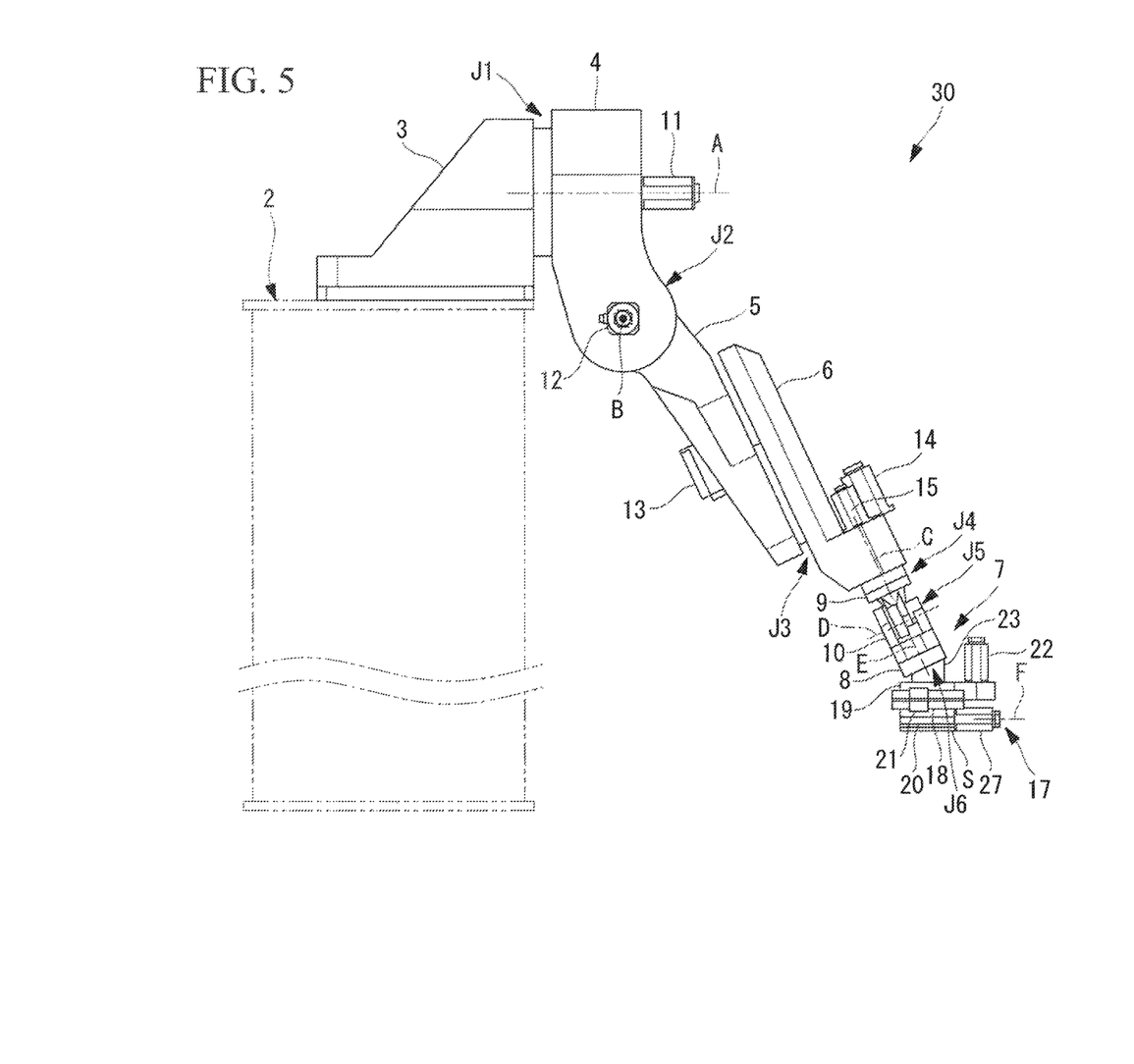
FIG. 5 is a side view of the conveying robot in FIG. 4.
Figure 6:
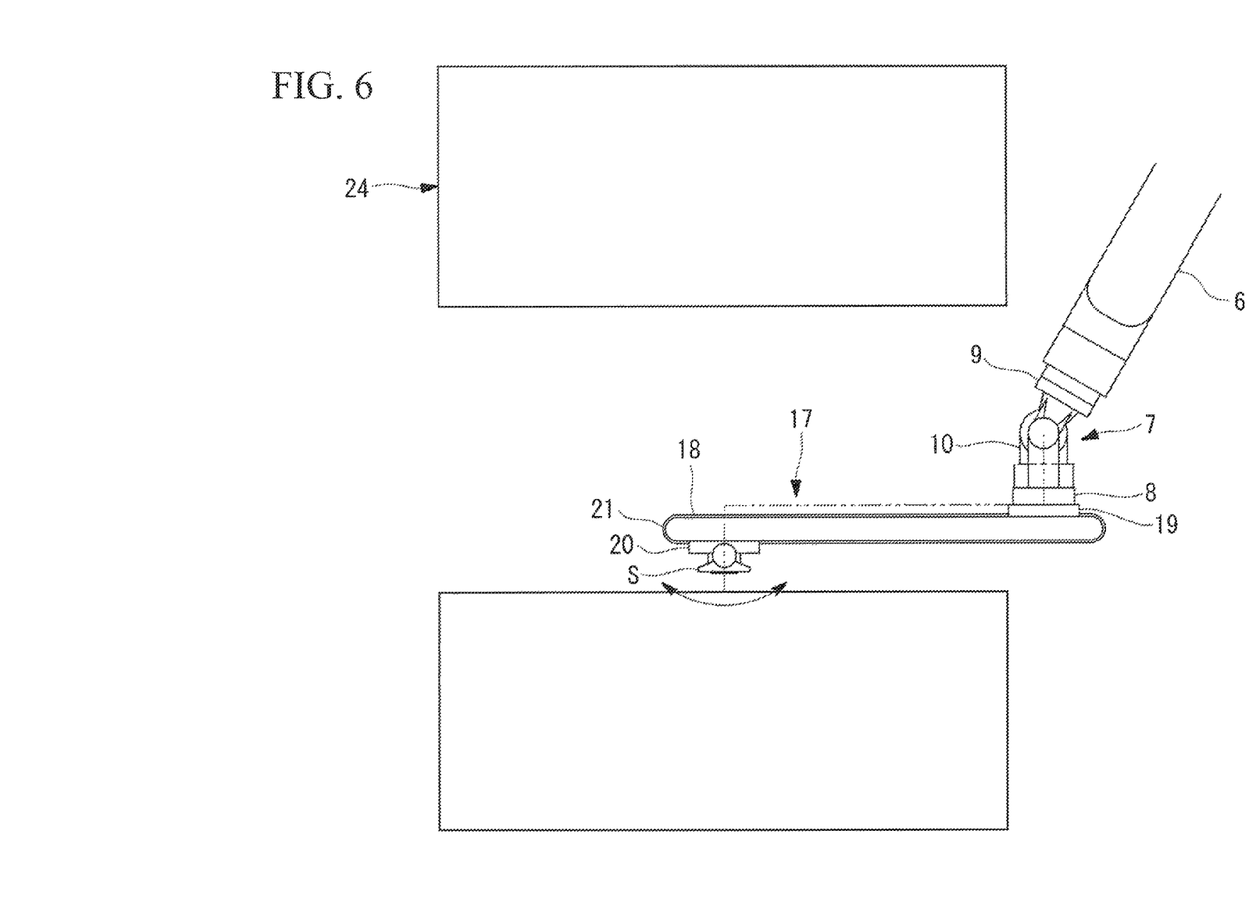
FIG. 6 is a side view illustrating a sliding arm provided in the conveying robot in FIG. 4.

The sliding arm 17 includes a band-plate-like (rectangular-flat-plate-like) frame 18 and sliders 19 and 20 disposed at opposite sides from each other with the frame 18 interposed therebetween in the thickness direction thereof.

The two sliders 19 and 20 are linked with each other by a belt 21 extended between pulleys (not shown) supported by opposite longitudinal ends of the frame 18 in a rotatable manner about parallel axes. When a motor 22 is driven to move the slider 19 toward one side in the longitudinal direction of the frame 18, the other slider 20 linked therewith by the belt 21 is moved toward the ether side in the longitudinal direction at the underside of the frame 18, thereby constituting a seventh shaft J7.

Thus, the two sliders 19 and 20 can be relatively moved away from each other along the longitudinal direction of the frame 18. The slider 19 driven by the motor 22 is secured to the sixth shaft J6 of the wrist unit 7. As shown in FIGS. 4 to 6, the other slider 20 is provided with a tool S for gripping a workpiece and an eighth shaft (distal-end swivel shaft) J8 that is driven by a motor 27 so as to swivel the tool S about an axis F extending in the width direction of the frame 18. In FIG. 6, an inclination link member 23, which will be described below, is not shown. A dashed line in FIG. 6 indicates a wrist-unit movement range within which the tool S grips a workpiece.

The conveying robot 30 according to this embodiment is provided with the inclination link member 23 that secures the face plate 8 of the wrist unit 7 and the slider 19 secured to the face plate 8 to each other such that a predetermined inclination angle is formed therebetween.

As shown in FIG. 5, the inclination link member 23 links the sixth shaft J6 of the wrist unit 7 and the sliding arm 17 to each other such that the width direction and the longitudinal direction of the sliding arm 17 are substantially horizontal when the first arm 5 is swiveled about the second axis B by a predetermined angle and the wrist unit 7 is disposed straight, that is, in a state where the fourth axis C and the sixth axis E are arranged in a single straight line.

The operation of the conveying robot 30 according to this embodiment having the above-described configuration will now be described with reference to a case where a workpiece is fed and ejected between two pressing devices 24 and 25 adjoining each other with a distance therebetween, as in a pressing system shown in FIG. 7.

As shown in FIGS. 4 and 5, the conveying robot 30 according to this embodiment swivels the first arm 5 about the second axis B by a predetermined angle so as to dispose the sliding arm 17 in a substantially horizontal orientation. In this case, the center of the sliding arm 17 in the width direction is disposed so as to be set on a line (pressing center line) P that connects the centers of the pressing devices 24 and 25.

Figure 7:
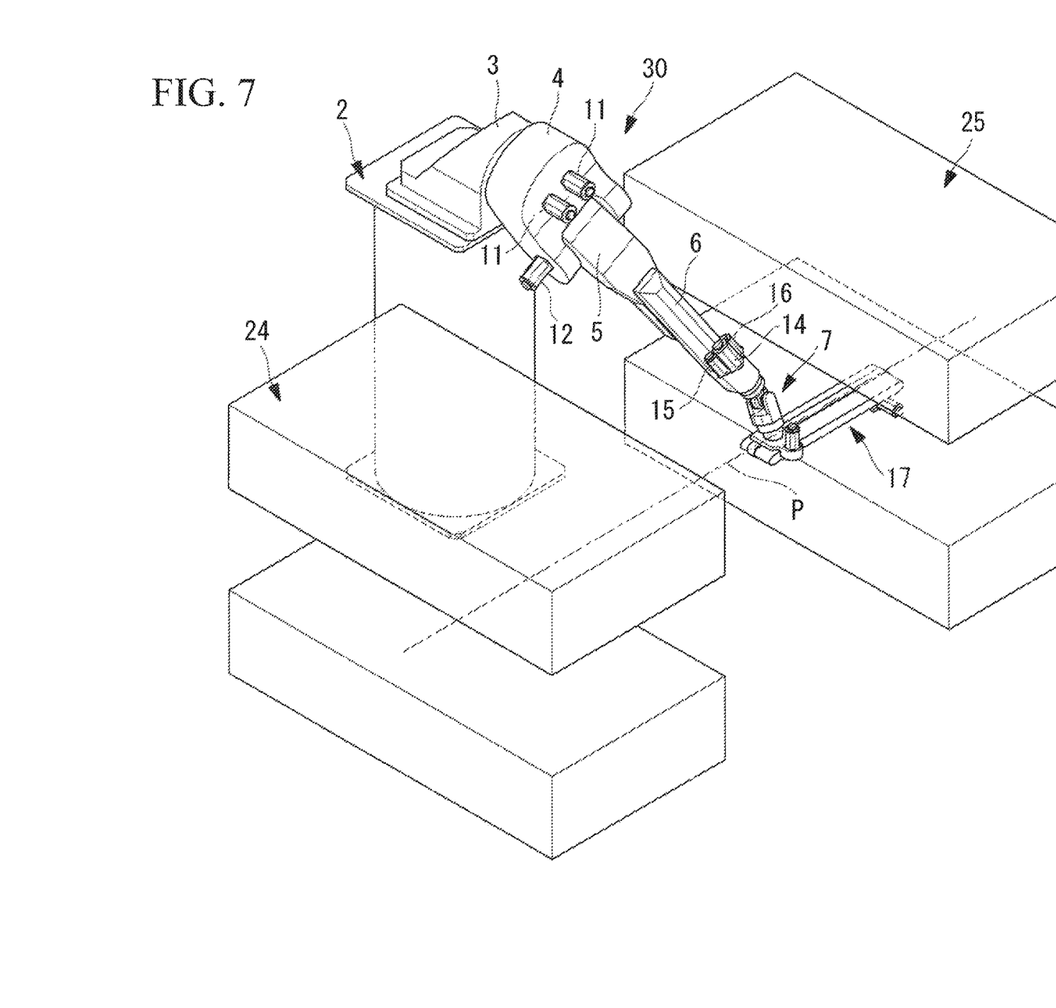
FIG. 7 is a perspective view illustrating a pressing system in which the conveying robot in FIG. 4 is disposed between two pressing devices.

Then, as shown in FIG. 7, the rotating base 4 is rotated in one direction about the first axis A relative to the pedestal 3 so as to cause the first arm 5 and the second arm 6 to move like a pendulum and also to cause the rotational shafts J4, J5, and J6 of the wrist unit 7 to move, thereby moving the sliding arm 17 along the pressing center line P while maintaining the substantially horizontal orientation of the sliding arm 17 and keeping the longitudinal direction and the width direction in fixed directions. In this case, the seventh shaft J7 of the sliding arm 17 is operated to cause the two sliders 19 and 20 to relatively move so that the frame 18 of the sliding arm 17 extends forward in the swiveling direction of the first arm 5.

Accordingly, in a state where the wrist unit 7 is disposed outside the pressing devices 24 and 25, the sliding arm 17 alone can be inserted into the pressing device 24. Then, at this position, the workpiece in the pressing device 24, such as a metal plate that has undergone one process of pressing, can be gripped and removed from dies (not shown) of the pressing device 24 by using the tool S provided on the slider 19.

In this state, the rotating base 4, the first arm 5, and the second arm 6 are moved like a pendulum so as to bring the wrist unit 7 close to the other pressing device 25, the wrist unit 7 is moved so as to maintain the orientation of the sliding arm 17, and the sliding arm 17 is operated to relatively move the two sliders 19 and 20 so that the frame 18 of the sliding arm 17 and the workpiece gripped by the tool S are inserted into the other pressing device 25. In this case, since the sliding arm 17 is moved along the pressing center line P, the tool S is operated so that the conveyed workpiece can be released and delivered to dies in the other pressing device 25.

The sliding arm 17 has the band-plate-like frame 18 and can have a sufficiently small thickness, as compared with the wrist unit 7. Therefore, the sliding arm 17 can be readily inserted into a small gap between upper and lower dies in the pressing device 24 or 25 so as to grip or release the workpiece.

In particular, when conveying the workpiece between the pressing devices 24 and 25, it is desirable that the tool S for gripping the workpiece be inserted between the dies of the pressing device 24 or 25 immediately after the dies start to open and be withdrawn from the pressing device 24 or 25 immediately before the dies close, so that an efficient pressing process can be achieved. Therefore, the sliding arm 17 having the small thickness is suitable as a mechanism to be inserted into the pressing devices 24 and 25.

Because the wrist unit 7 is moved along a linear trajectory in accordance with the rotation of the rotating base 4, the swiveling of the first arm 5, and the linear movement of the second arm 6 while maintaining the orientation of the sliding arm 17 using the three shafts J4, J5, and J6 of the wrist unit 7, the sliding arm 17 can be moved within the same plane, which is advantageous in that interference between the components of the pressing devices 24 and 25 and the sliding arm 17 can be avoided.

By linearly moving the second arm 6 in the longitudinal direction of the first arm 5 relative thereto, the entire arm constituted of the first arm 5 and the second arm 6 can be constantly maintained in a substantially straight shape, which is advantageous in that the components of the first arm 5 and the second arm 6 can be prevented from interfering with the components of the pressing devices 24 and 25 and the peripheral devices.

The sliding arm 17 relatively moves the two sliders 19 and 20 in the horizontal direction so as to cause the frame 18 to move horizontally. Thus, the moving direction of the frame 18 is aligned with the conveying direction of the workpiece, which is advantageous in that the workpiece can be conveyed at high speed by operating the sliding arm 17 even if the wrist is not moved by a large amount during the conveyance of the workpiece.

In the conveying robot 30 according to this embodiment, the wrist unit 7 is attached to the frame 18 of the sliding arm 17 by the inclination link member 23 such that the sixth axis E is inclined in the width direction of the frame 18. This is advantageous in that, when moving the sliding arm 17 while keeping it in a substantially horizontal orientation, the rotational shafts J4, J5, and J6 of the wrist unit 7 do not have to be moved excessively.

Figure 8:
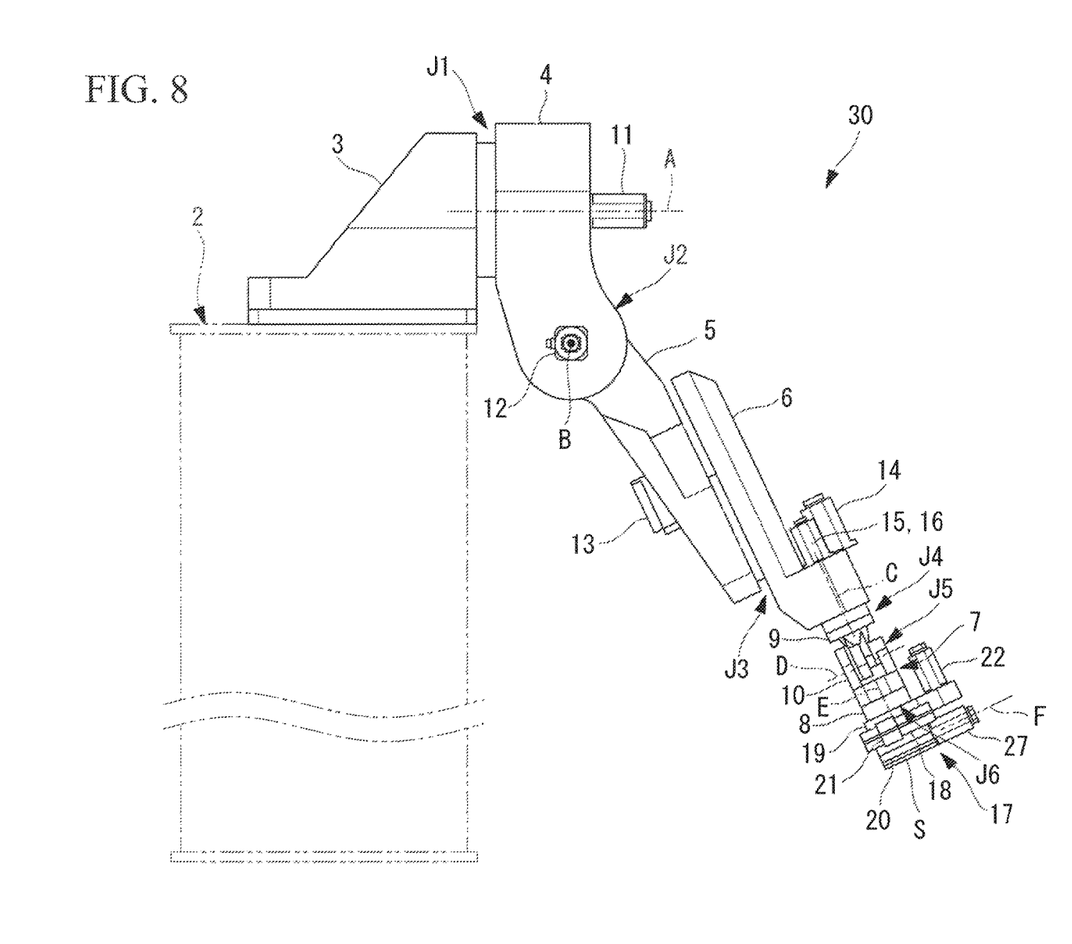
FIG. 8 is a side view illustrating a case where the conveying robot in FIG. 4 is not provided with an inclination link member.
Figure 9:
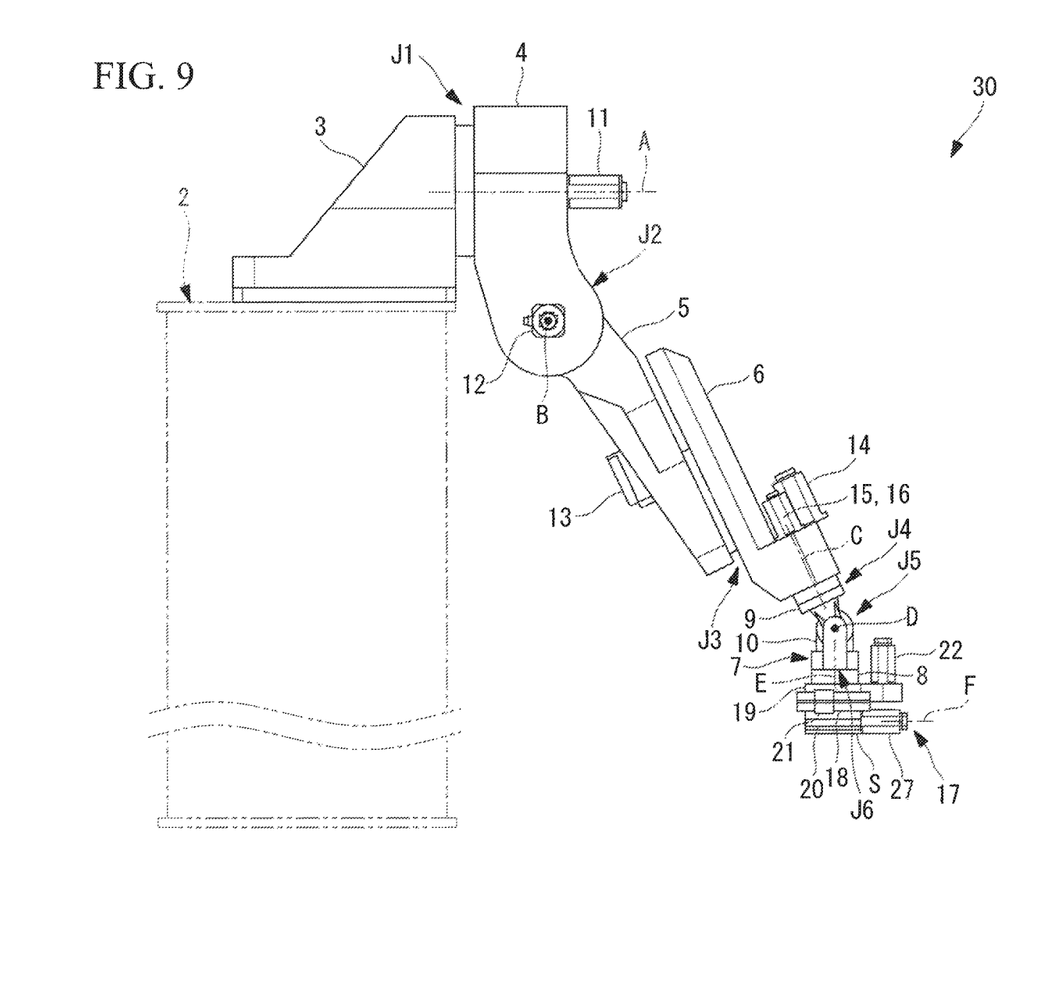
FIG. 9 is a side view illustrating a case where the sliding arm is set in a substantially horizontal state in the conveying robot in FIG. 8.

As shown in FIG. 8, in a case where the inclination link member 23 is not provided and the wrist unit 7 is attached to the frame 18 of the sliding arm 17 such that the sixth axis E is orthogonal to the width direction thereof, the angle of the wrist unit 7, particularly, the fifth shaft J5, has to be changed, as shown in FIG. 9, in order to set the sliding arm 17 in a substantially horizontal orientation. In order to linearly move the sliding arm 17 while keeping it in a substantially horizontal orientation in this state, one of the shafts (e.g., the sixth shaft J6) of the wrist unit 7 has to be rotated by an extremely large angle, as compared with the other shafts.

This causes the operating speed of the entire conveying robot 30 to be limited by the maximum speed of the shaft that rotates by the largest angle in the wrist unit 7, which is disadvantageous in that the conveying speed of the workpiece decreases.

In contrast, in this embodiment, the inclination link member 23 sets the sliding arm 17 in a substantially horizontal orientation even in a state where all of the shafts of the wrist unit 7 are disposed at their original positions. Thus, the rotational angles of the rotational shafts J4, J5, and J6 of the wrist unit 7 do not greatly increase during the conveyance of the workpiece, which is advantageous in that the conveying speed of the workpiece can be increased.

With regard to the two sliders 19 and 20 of the sliding arm 17 in the conveying robot 30 according to this embodiment, the slider 19 is secured to the sixth shaft J6 of the wrist unit 7, and the slider 20 disposed at the opposite side of the frame 18 has the tool S attached thereto via the eighth shaft J8, so that the angle of the tool S around the axis F extending in the width direction of the frame 18 can be changed by operating the eighth shaft J8.

Due to various shapes of workpieces to be pressed, the direction in which a workpiece is to be removed from the dies in the pressing devices 24 and 25 is not limited to the vertical direction. In such a case, the tool S is tilted by operating the eighth shaft J8, as shown in FIG. 6, so that the inclination of the tool S can be adjusted to the ejecting direction of the workpiece without having to change the orientation of the sliding arm 17.

Figure 10:
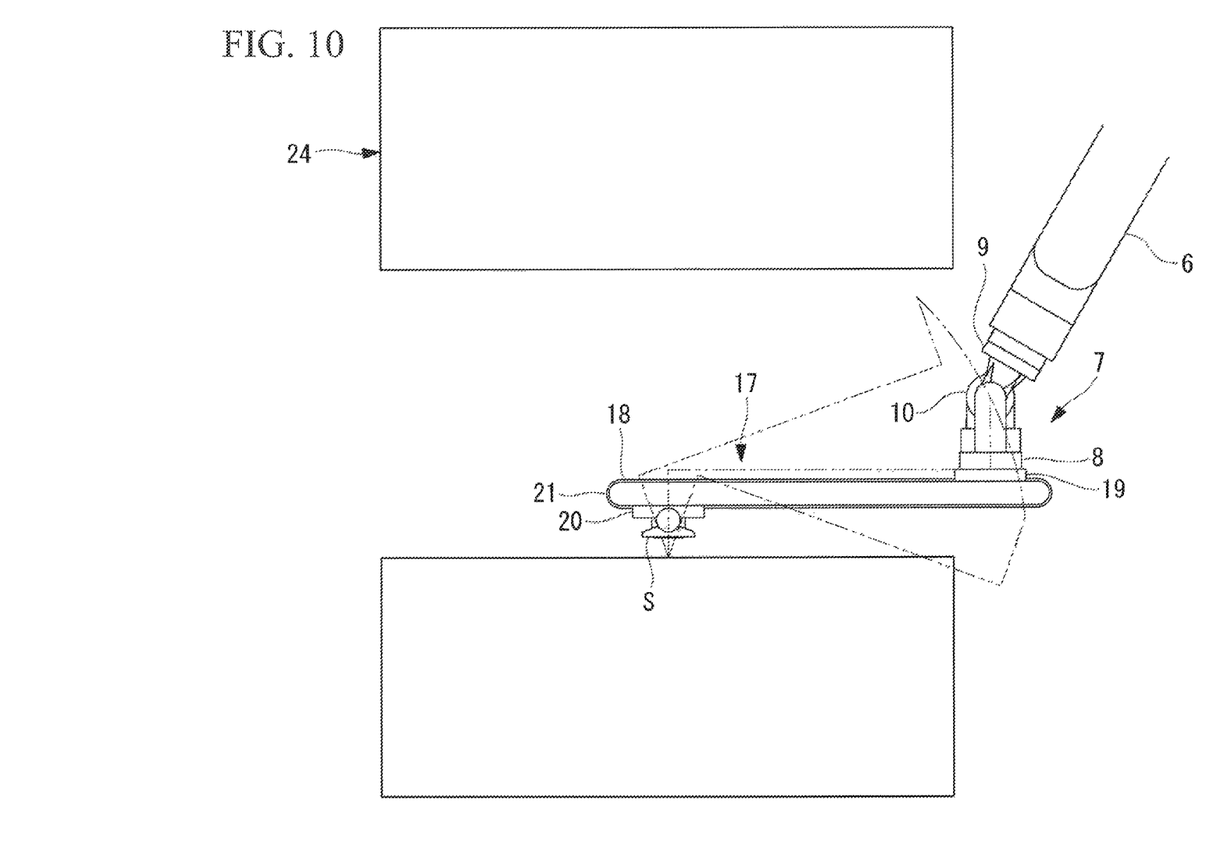
FIG. 10 is a side view of the sliding arm and explains a case where the inclination angle of a tool is changed without having to operate an eighth shaft in the conveying robot in FIG. 4.

Supposing that the eighth shaft J8 is not to be used or the eighth shaft J8 is not provided, changing the inclination of the tool S involves changing the orientation of the sliding arm 17 by shifting the position of the wrist unit 7 of the conveying robot 30, as shown in FIG. 10. This increases the possibility of the second arm 6 or the wrist unit 7 and the sliding arm 17 interfering with the pressing devices 24 and 25 and the peripheral devices. In FIG. 10, a dashed line indicates a movement range of the wrist unit 7 within which the tool S grips a workpiece.

As shown in FIG. 6, the conveying robot 30 according to this embodiment includes the eighth shaft J8 so that the conveying robot 30 can be readily prevented from interfering with the pressing devices 24 and 25 and the peripheral devices, and the movements of the rotating base 4, the first arm 5, the second arm 6, and the wrist unit 7 for changing the angle of the tool S can be minimized, thereby advantageously preventing an increase in conveying time.

Figure 11:
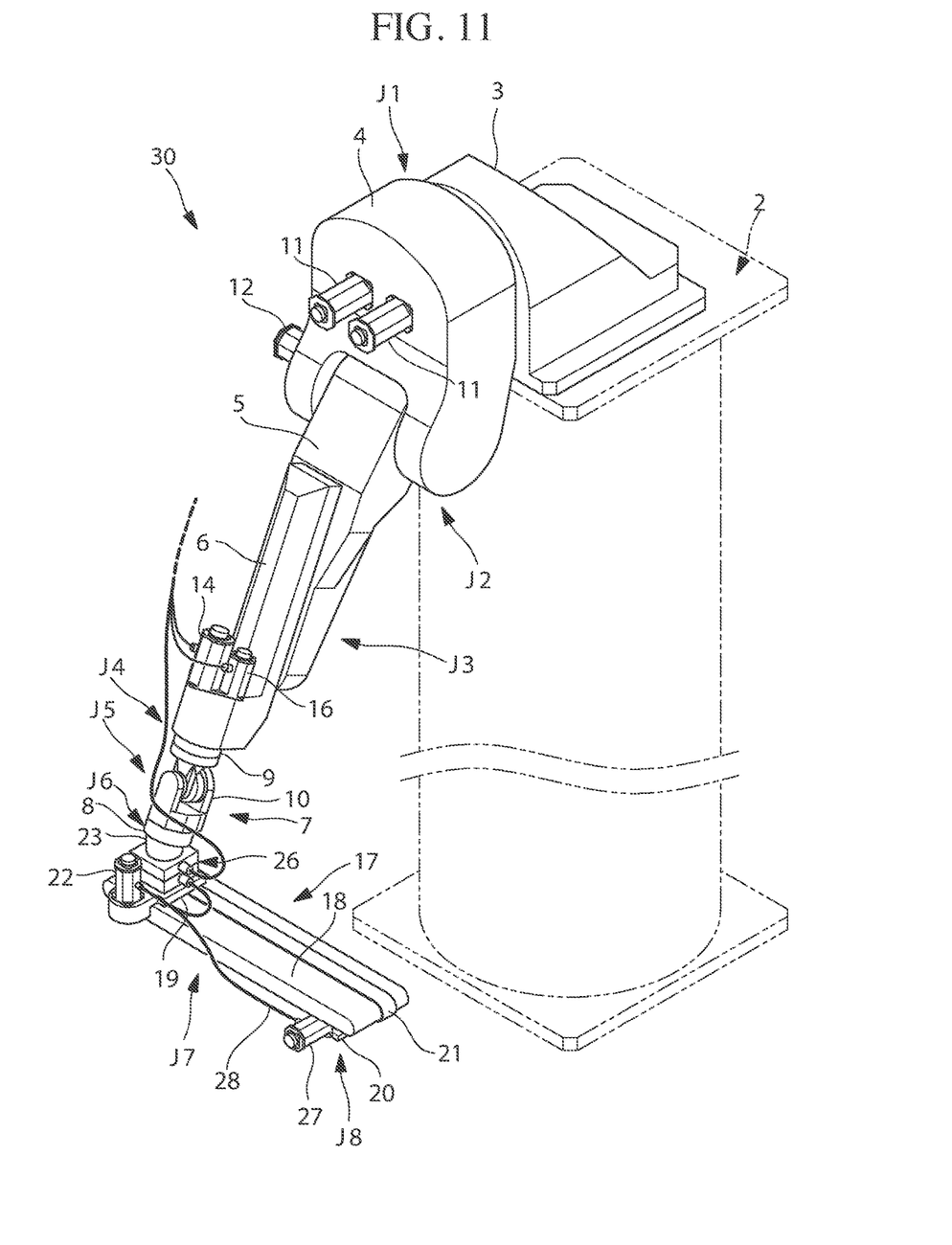
FIG. 11 illustrates a modification of the conveying robot in FIG. 4 and is a perspective view of the conveying robot provided with an attaching/detaching mechanism between a wrist unit and the sliding am.
Figure 12:
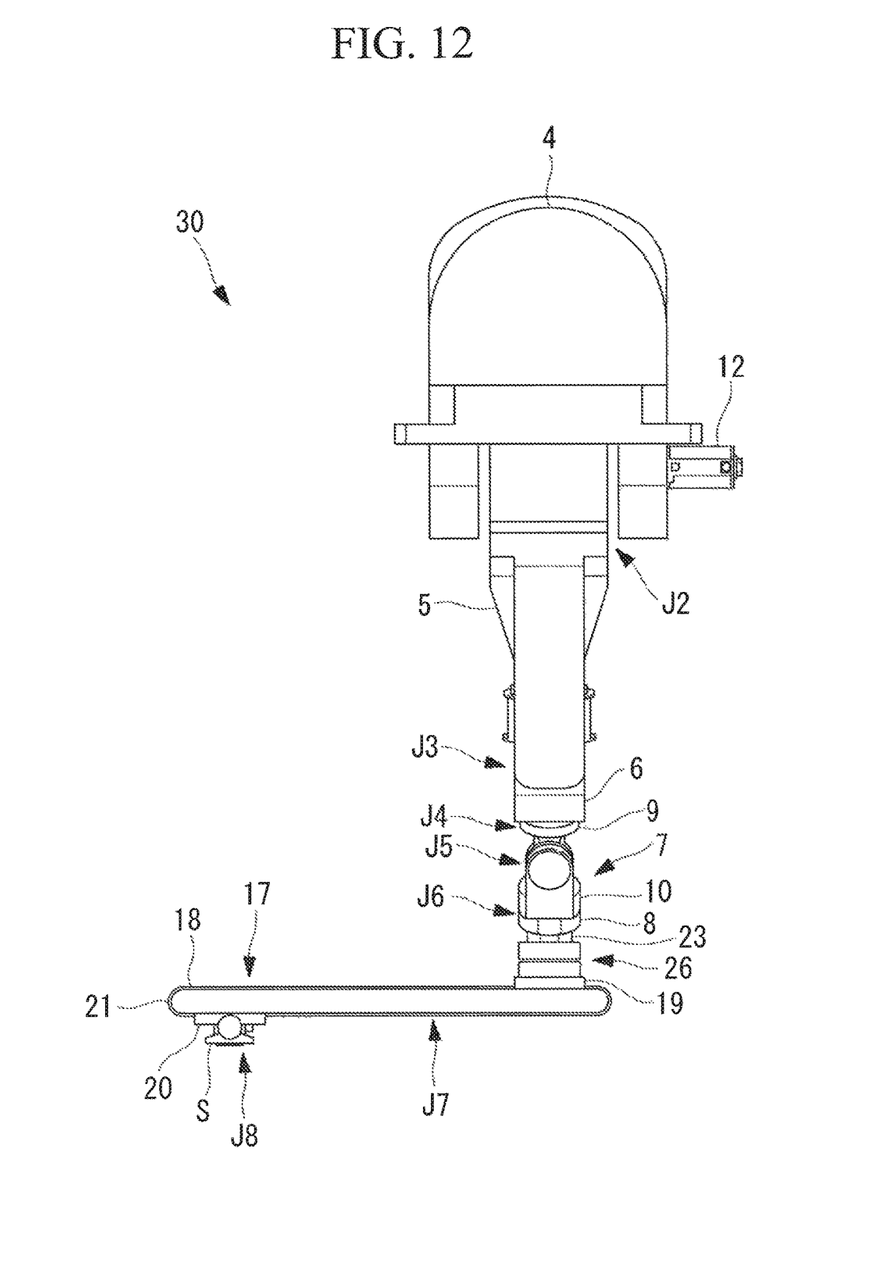
FIG. 12 is a rear view of the conveying robot in FIG. 11.

As shown in FIGS. 11 and 12, this embodiment may be provided with an attaching/detaching mechanism 26 that is disposed between the wrist unit 7 and the sliding arm 17 and that mechanically attaches or detaches the sixth shaft J6 of the wrist unit 7 to or from the slider 19 of the sliding arm 17.

Normally, in a single pressing device 24, various kinds of pressing are performed on workpieces by switching dies. Therefore, tools S with different shapes are necessary in accordance with the shapes of workpieces. By preparing a plurality of sliding arms 17 equipped with tools S having different shapes and then operating the attaching/detaching mechanism 26 to entirely switch sliding arms 17 equipped with the tools S, various kinds of pressing can be performed on workpieces.

Although the attaching/detaching mechanism 26 used may have a known structure, the attaching/detaching mechanism 26 at least needs to mechanically attach or detach electrical wires 28 or operating the seventh shaft J7 and the eighth shaft J8, provided in the sliding arm 17, by means of electrical signals. If it is necessary to feed a fluid to the sliding arm 17, a fluid channel (not shown) also needs to be attachable and detachable.

By providing the attaching/detaching mechanism 26, the tool S can be quickly replaced and the time spent for changing a workpiece to be processed can be shortened, which is advantageous in terms of improved productivity of the pressing process.

In this case, because the attaching/detaching mechanism 26 has a fixed thickness, it is preferable that the attaching/detaching mechanism 26 not be disposed between a face plate (not shown), provided at the distal end of the eighth shaft J8 of the sliding arm 17, and the tool S since that would increase the thickness of a section to be inserted into the pressing devices 24 and 25. According to this embodiment, the attaching/detaching mechanism 26 is provided between the wrist unit 7, which is not to be inserted into the pressing devices 24 and 25, and the slider 19, so that the thickness of the section to be inserted into the pressing devices 24 and 25 can be kept small.

The attaching/detaching mechanism 26 is not limited to a case where it is disposed between the sixth shaft J6 and the slider 19, and may be disposed somewhere between the pedestal 3 and the tool S so long as it mechanically attaches or detaches the rotating base 4, the first arm 5, the second arm 6, the wrist unit 7, the sliding arm 17, or the tool S together with electrical wires by means of electrical signals.

As a result, the following aspect is read from the above described embodiment of the present invention.

In order to achieve the aforementioned object, the present invention provides the following solutions.

An aspect of the present invention provides a conveying robot including: a pedestal; a rotating base provided in a rotatable manner about a first axis, which is substantially horizontal, relative to the pedestal; a first arm provided on the rotating base in a swivelable manner about a second axis that is orthogonal to an axis parallel to the first axis; and a second arm that is provided on the first arm in a movable manner along a longitudinal direction of the first arm and whose distal end supports a wrist unit, which is capable of holding a workpiece to be conveyed.

According to this aspect, the workpiece is held by the wrist unit, the wrist unit is disposed away from the first axis by swiveling the first arm about the second axis relative to the rotating base, and the rotating base is rotated about the first axis relative to the pedestal, so that the workpiece can be moved. For example, by disposing the wrist unit in an area vertically below the first axis and rotating the rotating base, the wrist unit can be moved substantially in the horizontal direction, and the workpiece held by the wrist unit can be moved substantially in the horizontal direction.

In this case, the rotating base can be rotated like a pendulum by utilizing the gravitational force of the first arm, the second arm, and the wrist unit. Therefore, the rotating base can be rotated in accordance with high acceleration and deceleration, so that the workpiece can be conveyed at high speed.

By moving the second arm in the longitudinal direction of the first arm in accordance with the rotation of the rotating base, the workpiece can be linearly moved substantially in the horizontal direction.

By changing the swivel angle of the first arm, the workpiece can be moved at positions with various distances from the pedestal in the horizontal direction.

Therefore, the pedestal can be installed at one location away from the workpiece, so that the space occupied by the robot can be reduced, an increase in size of the system can be prevented, the cost can be reduced, and a wide space required for maintenance can be ensured.

With respect to a workpiece disposed at any position in the horizontal direction relative to the pedestal, the first arm and the second arm disposed between the rotating base and the wrist unit can be maintained in a substantially straight shape, which connects the rotating base and the wrist unit, since the second arm is moved along the longitudinal direction of the first arm. Thus, unwanted protrusions of joint sections caused by folding of the arms can be minimized, thereby readily avoiding interference with peripheral devices.

In the above aspect, a movement range within which the first arm is moved about the first axis by the rotating base may be disposed in or below a substantially horizontal plane including the first axis.

Accordingly, the rotation of the rotating base can be limited to the pendulum-like rotating motion so as to enable high acceleration and deceleration, whereby the workpiece can be conveyed at high speed. By rotating the rotating base to swivel the first arm to a substantially horizontal position, a compact conveying configuration can be realized.

In the above aspect, the pedestal may be installed such that the wrist unit is moved substantially in the same direction as a conveying direction of the workpiece by a swiveling motion of the first arm about the first axis caused by the rotating base.

Accordingly, the pedestal is installed at one location away from the conveying space of the workpiece, and the first arm and the second arm are rotated like a pendulum by rotating the rotating base, whereby the workpiece can be conveyed at high speed.

In the above aspect, the wrist unit may include at least two rotational shafts that intersect each other.

Accordingly, with the rotation of the rotating base, the swiveling of the first arm, and the linear movement of the second arm, the workpiece attached to the distal end of the wrist unit disposed at a freely-chosen position can be maintained in a fixed orientation.

In the above aspect, the conveying robot may further include a sliding arm having a band-plate-like frame and a pair of sliders disposed at opposite sides from each other with the frame interposed therebetween in a thickness direction. The pair of sliders may be provided in a relatively movable manner along a longitudinal direction of the frame. One of the sliders may be attached to the rotational shaft at a terminal end of the wrist unit.

Accordingly, the workpiece is held in an attachable-detachable manner to the slider disposed at the opposite side, in the thickness direction of the frame, from the slider attached to the rotational shaft of the wrist unit, so that the longitudinal direction of the thin band-plate-like frame can be extended in the conveying direction, thereby enabling a reciprocating motion in the longitudinal direction of the frame relative to the wrist unit.

Accordingly, the workpiece can be attached or detached by simply inserting the thin band-plate-like frame without having to dispose the wrist unit in the vicinity of the workpiece, so that a large space used for attaching and detaching the workpiece does not have to be ensured around the workpiece, and interference with peripheral devices can be readily avoided. The rotating motion of the first arm can be compensated for by the reciprocating motion of the slider caused by the sliding arm, the movement range of the first arm can be reduced, interference with peripheral devices can be avoided, and the conveying speed can be increased.

In the above aspect, the other slider may be provided with a distal-end swivel shaft that swivels a tool, which grips the workpiece, about an axis extending in a width direction of the frame.

Accordingly, the angle of the tool that grips the workpiece can be changed by operating the distal-end swivel shaft provided in the slider without having to change the orientation of the sliding arm. As a result, even if the workpiece needs to be conveyed while tilting the workpiece, interference between the sliding arm and peripheral devices can be avoided by maintaining the orientation of the sliding arm, and moreover, the movements of the rotating base, the first arm, the second arm, and the wrist unit can be minimized.

In the above aspect, the conveying robot may further include an attaching/detaching mechanism that is disposed between the pedestal and the tool and that makes the rotating base, the first arm, the second arm, the wrist unit, the sliding arm, or the tool mechanically attachable and detachable together with an electrical wire by means of an electrical signal.

In the above aspect, the conveying robot may further include an attaching/detaching mechanism that can mechanically attach and detach the rotational shaft at the terminal end of the wrist unit to and from the sliding arm together with an electrical wire therebetween by means of an electrical signal.

Accordingly, the attaching/detaching mechanism, which requires relatively large dimensions, is disposed between the wrist unit and the sliding arm, so that the attaching/detaching mechanism does not have to be disposed in the vicinity of the workpiece. As a result, when using the attaching/detaching mechanism to replace a gripping tool for gripping the workpiece in accordance with the type of workpiece, a large space does not need to be formed in the vicinity of the workpiece.

In the above aspect, the wrist unit may include three rotational shafts that intersect each other, and the wrist unit and one of the sliders may be attached to each other such that the rotational shaft at the terminal end of the wrist unit is inclined in a width direction of the sliding arm.

Accordingly, when the first arm, which tilts relative to the vertical axis, and the sliding arm disposed at the distal end of the second arm are to be moved while being maintained at predetermined orientations, such as substantially horizontal orientations, the wrist unit does not have to be moved by a large amount, so that the conveying speed can be increased.

REFERENCE SIGNS LIST 1, 30 conveying robot
3 pedestal
4 rotating base
5 first arm
6 second arm
7 wrist unit
17 sliding arm
18 frame
19, 20 slider
26 attaching/detaching mechanism
A first axis
B second axis
C fourth axis (rotational axis)
D fifth axis (rotational axis)
E sixth axis (rotational axis)
S tool
J8 eighth shaft (distal-end swivel shaft)

The invention claimed is:

1. A conveying robot comprising:
a pedestal;
a rotating base provided in a rotatable manner about a first axis, which is substantially horizontal, relative to the pedestal;
a first arm provided on the rotating base in a swivelable manner about a second axis that is orthogonal to a line parallel to the first axis and spaced from the first axis; and
a second arm that is provided on the first arm in a movable manner along a longitudinal direction of the first arm and distal end of the second arm supports a wrist unit, which is capable of holding a workpiece to be conveyed,
wherein the proximal end portion of the first arm is supported by the rotating base.

2. The conveying robot according to claim 1,
wherein a movement range in which the first arm rotates about the first axis by the rotating base is disposed in or below a substantially horizontal plane including the first axis.

3. The conveying robot according to claim 2,
wherein the pedestal is installed such that the wrist unit is moved substantially in the horizontal direction below the first axis by a swiveling motion of the first arm about the first axis caused by the rotating base.

4. The conveying robot according to claim 1,
wherein the wrist unit includes at least two rotational shafts that intersect each other.

5. The conveying robot according to claim 1, further comprising:
a sliding arm having a strip-shaped frame and a pair of sliders disposed at opposite sides from each other with the frame interposed therebetween in a thickness direction, the pair of sliders being provided in a relatively movable manner along a longitudinal direction of the frame,
wherein one of the sliders is attached to the rotational shaft at a terminal end of the wrist unit.

6. The conveying robot according to claim 5,
wherein the other slider is provided with a distal-end swivel shaft that swivels a tool, which grips the workpiece, about an axis extending in a width direction of the frame.

7. The conveying robot according to claim 6, wherein the rotating base, the first arm, the second arm, the wrist unit, the sliding arm, or the tool are attachable and detachable together with an electrical wire by means of an electrical signal.

8. The conveying robot according to claim 5, wherein the rotational shaft at the terminal end of the wrist unit is attachable to and detachable from the sliding arm together with an electrical wire therebetween by means of an electrical signal.

9. The conveying robot according to claim 5,
wherein the wrist unit includes three rotational shafts that intersect each other, and
wherein the wrist unit and one of the sliders are attached to each other such that the rotational shaft at the terminal end of the wrist unit is inclined in a width direction of the sliding arm.

* * * * *